Aug. 16, 1938.    R. S. HAYES    2,126,883
BRAKE STRUCTURE
Filed Oct. 26, 1936
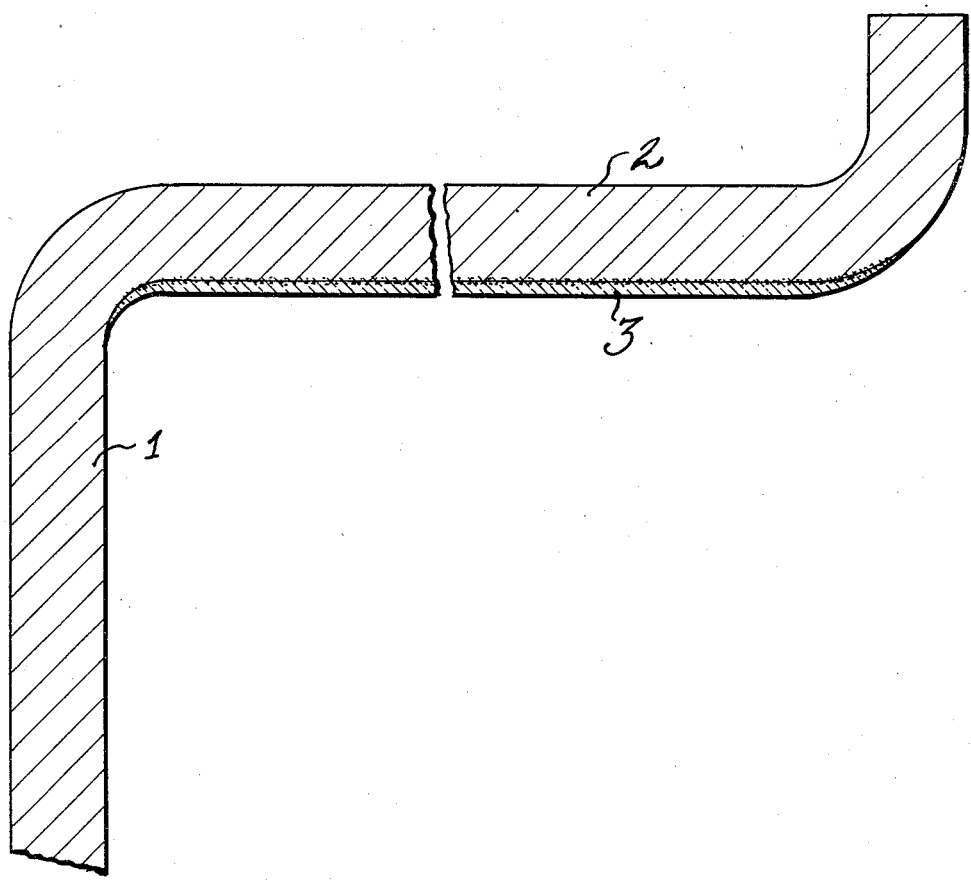
INVENTOR
RALPH S. HAYES
BY
Donald B Waite
HIS ATTORNEY Patented Aug. 16, 1938

2,126,883

UNITED STATES PATENT OFFICE 2,126,883

BRAKE STRUCTURE

Ralph S. Hayes, Lakewood, Ohio, assignor of forty percent to William J. Smith, Rocky River, Ohio, and nine percent to Donald B. Waite, Cleveland Heights, Ohio Application October 26, 1936, Serial No. 107,614

7 Claims. (Cl. 188—218)

This invention relates to brake structures, and more particularly to brake drums.

The usual brake drum now employed comprises either a low carbon steel member or a member having its braking flange lined with cast iron or with an alloy. One of the chief objections to low carbon steel drums is that they are not of granular structure and in use the metal at the friction surface thereof is subject to rapid wear and tends to tear up and become pitted through contact therewith of the friction material, rivets or foreign particles picked up by the friction material thereby causing rapid wearing of the friction material associated therewith. Pitting and scratching is detrimental to proper braking action due to the unevenness of the braking surface. These disadvantages have been partly overcome by providing the braking flange with a lining of cast iron or alloy by a centrifugal casting process or by securing such a lining thereto by bolts or rivets, but in such cases the weight of the drum is materially increased, which is objectionable from the manufacturer's and designer's viewpoint, and also the cost of producing drums of this nature is very materially increased, due to the expensive equipment required and to the cost of the additional machining and grinding operations that are necessary.

The principal object of the present invention is to provide a brake drum which is of no greater weight than the usual steel drum and can be produced at no substantial increase in cost, and, yet, will have a braking surface of superior characteristics.

Another object is to provide a brake drum or brake element having a braking surface of a dense, non-porous, glass-hard, non-metallic material which is resistant to corrosion and abrasion and which is capable of long use without appreciable wear.

Another object is to provide a brake drum or brake element having a braking surface, non-metallic in nature, which forms an integral part thereof, and, yet, while being unaffected by the generation of heat due to friction, will not retard the conduction of heat.

A further object is to provide a brake drum having a braking surface of non-metallic, glass-hard material forming an integral part thereof, which is of such thinness that it will flex without breaking or chipping during distortion of the drum in service.

With the above and other objects in view, the present invention consists in certain features of construction and combinations of parts to be hereinafter described and then claimed.

The single figure of the drawing is a sectional fragmentary view of a brake drum produced in accordance with the present invention, the thickness of the braking flange and the braking material or surface being exaggerated for purposes of illustration.

In accordance with the present invention, a brake drum 1, preferably of enameling iron or low carbon steel, is treated in such manner as to provide the braking flange 2 thereof with a braking surface 3 of non-metallic material, which, while very thin, is glass-hard, non-porous and resistant to corrosion and abrasion, such surface being composed of glass or vitrified enamel. It is to be understood, however, that the drum may be formed of materials other than enameling iron or low carbon steel, such as, for example, cast metals capable of having a braking surface applied thereto in accordance with the present invention.

The surface to be treated may, if desired, be machined or otherwise finished in the event it should not be accurate with respect to concentricity.

The material employed is a frit of the character used in vitreous enameling and preferably containing cobalt oxide or its equivalent, and for the most part such materials as Feldspar, borax and quartz.

The frit is milled with a liquid and the brake drum is dipped in this material to provide the braking flange with a coating corresponding to a ground coating of uniform thickness. The coating is then allowed to dry after which it is subjected to a burning process at a temperature preferably of between 1600° and 1700° F., this temperature being sufficiently low to prevent distortion of the drum during the burning process. Other temperatures, however, may be employed, depending, of course, upon the constituents of the coating.

Preferably, the coating applied, whether this be by dipping, spraying or any other suitable method, should be such that the resulting braking surface is of extreme thinness, so that it will flex without rupture upon distortion of the drum during service. I have found that thicknesses of approximately .010 inch are very satisfactory.

The resulting braking surface is, due to the nature of the coating and the burning process, non-porous and glass-hard, and forms an integral part of the brake drum. During the burning process, the coating and surface metal of the braking flange became integrally bonded, alloyed or fused, due to the solution of the metal in the enamel, this action being assisted by the cobalt oxide, resulting in a field of slag at the region of adhesion.

Since the braking surface is of high density and therefore non-porous, it is impervious to moisture with the result that it is resistant to corrosion which frequently results from the accumulation of moisture within the drum through condensation or the splashing of water into the drum during service.

Vitrified enamels, of course, are heat resistant and in the brake drum of the present invention the braking surface is so thin that the conduction of heat through the drum is not lessened.

Furthermore, the braking surface is of such thinness and so definitely bonded to the metal of the drum that it will withstand any and all distortion, of the drum in service due to the application of braking pressure, without chipping or cracking. As previously explained, the use of cobalt oxide in the enamel increases the solution of iron in the enamel and this in addition to assisting in the bonding action provides for a gradual decrease of the difference of thermal expansion that ordinarily exists between the enamel-iron interface and the surface of the enamel. This prevents rupture of the braking surface during expansion and contraction due to heat and due to distortion of the drum in service.

Another distinct advantage of the braking surface described is that it is resistant to abrasive action and is not subject to wear through the accumulation of dirt and dust particles on the lining or through contact of the rivets which may appear upon wearing down of the friction material associated with the brake shoes or brake band. Also, initial wear on the lining will be materially reduced.

While I have described the treatment of the braking flange, it is to be understood that the entire drum may be treated in a similar manner, thus insuring that the drum structure itself will not be subject to corrosion.

It is to be understood that the invention is also applicable to brake elements other than brake drums.

Summarizing the characteristics of the invention described, I have provided a brake drum having a braking surface which is glass-hard, heat and acid resistant and resistant to corrosion and wear.

The braking surface is of high density and therefore non-porous and impervious to moisture. In addition, the braking surface will withstand distortion of the drum in service without cracking or chipping.

The brake drum described is of no greater weight than conventional steel drums and is of materially less weight than drums provided with a cast iron or alloy lining, and can be produced at a much lower cost than metal lined drums. These features are of material advantage to the manufacturer and designer. Another advantageous feature is that no machining operations are necessary.

While I have described a particular embodiment of the invention, it is to be understood that this is by way of example only; the vitrified enamel is to be taken as indicative of any other non-metallic material capable of being integrally united with the metal and capable of producing the results and advantages herein set forth. Since the invention is susceptible of modification and range of choice as to the particular materials employed, I do not intend to be limited, except as such limitations are clearly imposed by the appended claims.

What I claim is:

1. A brake drum comprising a metallic member having a braking portion provided with a hard, non-metallic braking surface, said surface comprising a coating of vitreous material of such thinness as to distort without rupture upon distortion of said member.

2. A brake drum comprising a metallic member having a braking flange provided with a substantially continuous braking surface, comprising a non-metallic coating integrally diffused with the surface metal of said flange and being non-porous and of glass-hardness.

3. A brake drum comprising a metallic member having a braking flange provided with a braking surface composed of a vitrified enamel of extreme thinness capable of flexing without rupture upon distortion of said braking flange.

4. A brake drum comprising a metallic member having a braking flange provided with a glass-hard, non-porous, heat resistant braking surface composed of a vitrified enamel of extreme thinness.

5. A brake drum comprising a ferruginous foundation metal having a non-porous vitrified braking surface, said surface comprising a ground coating of enamel.

6. A brake member comprising a metallic base portion having a friction surface of glass-hard, non-porous, non-metallic material, said surface being of extreme thinness and capable of distortion without rupture, said material being integrally bonded with said base portion.

7. A brake drum comprising a ferruginous foundation metal having a vitrified braking surface comprising a ground coating of enamel.

RALPH S. HAYES.